United States Patent
Lennhoff

(10) Patent No.: US 7,790,135 B2
(45) Date of Patent: Sep. 7, 2010

(54) CARBON AND ELECTROSPUN NANOSTRUCTURES

(75) Inventor: John D. Lennhoff, North Andover, MA (US)

(73) Assignee: Physical Sciences, Inc., Andover, MA (US)

( * ) Notice: Subject to any disclaimer, the term of this patent is extended or adjusted under 35 U.S.C. 154(b) by 1447 days.

(21) Appl. No.: 10/884,796

(22) Filed: Jul. 1, 2004

(65) Prior Publication Data

US 2005/0025974 A1   Feb. 3, 2005

Related U.S. Application Data

(60) Provisional application No. 60/484,335, filed on Jul. 2, 2003.

(51) Int. Cl.
*D01F 9/12* (2006.01)
*C01B 31/00* (2006.01)

(52) U.S. Cl. .......... 423/447.1; 977/842; 423/447.8; 264/29.1

(58) Field of Classification Search .......... 977/842; 423/447.1, 447.8; 264/29.1
See application file for complete search history.

(56) References Cited

U.S. PATENT DOCUMENTS

| | | | |
|---|---|---|---|
| 4,345,414 A | 8/1982 | Bornat et al. | |
| 4,468,922 A | 9/1984 | McCrady et al. | |
| 4,663,230 A | 5/1987 | Tennent | |
| 5,024,789 A | 6/1991 | Berry | |
| 6,106,903 A | 8/2000 | Upadhya | |
| 6,106,913 A | 8/2000 | Scardino et al. | |
| 6,265,333 B1 | 7/2001 | Dzenis et al. | |
| 6,265,466 B1 | 7/2001 | Glatkowski et al. | |
| 6,308,509 B1 | 10/2001 | Scardino et al. | |
| 6,333,016 B1 | 12/2001 | Resasco et al. | |
| 6,382,526 B1 | 5/2002 | Reneker et al. | |
| 6,514,897 B1 | 2/2003 | Moy et al. | |
| 6,520,425 B1 | 2/2003 | Reneker | |
| 2001/0045547 A1* | 11/2001 | Senecal et al. ........... 252/501.1 |
| 2002/0122840 A1 | 9/2002 | Lee et al. | |

OTHER PUBLICATIONS

Doshi, J. and D.H. Reneker, Electrospinning process and applications of electrospun fibers, Oct. 1993, Conference Record of the 1993 IEEE, vol. 3, 1698-1703.*

(Continued)

*Primary Examiner*—David M. Brunsman
*Assistant Examiner*—Kevin M Johnson
(74) *Attorney, Agent, or Firm*—Hamilton, Brook, Smith & Reynolds, P.C.

(57) ABSTRACT

The present invention is directed to the production of nanostructures, e.g., single wall carbon nanotubes ("SWNT") and/or multi-wall carbon nanotubes ("MWNT"), from solutions containing a polymer, such as polyacrylonitrile (PAN). In particular, the invention is directed to the production of nanostructures, for example, SWNT and/or MWNT, from mixtures, e.g., solutions, containing polyacrylonitrile, polyaniline emeraldine base (PANi) or a salt thereof, an iron salt, e.g., iron chloride, and a solvent. In one embodiment, a mixture containing polyacrylonitrile, polyaniline emeraldine base or a salt thereof, an iron salt, e.g., iron chloride, and a solvent is formed and the mixture is electrospun to form nanofibers. In another embodiment, the electrospun nanofibers are then oxidized, e.g., heated in air, and subsequently pyrolyzed to form carbon nanostructures.

32 Claims, 4 Drawing Sheets

OTHER PUBLICATIONS

Reneker, Darrell and Hao Fong, Elastomeric Nanofibers of Styrene-Butadiene-Styrene Triblock Copolymer, 1999, Journal of Polymer Science Part B: Polymer Physics, vol. 37, p. 3488-3493.*

Wang, Yu, et al., "Pyrolysis Temperature and Time Dependence of Electrical Conductivity Evolution for Electrostatically Generated Carbon Nanofibers," *IEEE Transactions on Nanotechnology* 2(1):39-43 (2003).

Ko, Frank K., et al., "Structure and Properties of Carbon Nanotube Reinforced Nanocomposites," *The American Institute of Aeronautics and Astronautics* 2002-1426.

MacDiarmid, Alan G., "Synthetic Metals: A Novel Role for Organic Polymers" (Nobel Lecture), *Angew. Chem. Int. Ed.* 40:2581-2590 (2001).

MacDiarmid, Alan G., "Synthetic Metals: A Novel Role for Organic Polymers," Synthetic Metals 125:11-22 (2002).

Norris, I., et al., Electrostatic Fabrication (Electrospinning) of Nano-Fibers of Polyaniline Blends with Conventional Polymers, *Meeting of the American Physical Society*, Mar. 20-24, 2000.

Serrano, S., "Fabrication and Properties of Rapid Thermally Processed Carbon Nanofibers," *NSF Summer Undergraduate Fellowship Report*, Drexel University, May 27, 2002.

Rutledge, G., et al., "Electrostatic Spinning and Properties of Ultrafine Fibers," *National Textile Center Annual Report*, Nov. 2002.

Rutledge, G., et al., "A Fundamental Investigation of the Formation and Properties of Electrospun Fibers," *National Textile Center Annual Report*, Nov. 2000.

Rutledge, G., et al., "A Fundamental Investigation of the Formation and Properties of Electrospun Fibers," *National Textile Center Annual Report*, Nov. 1999.

Rutledge, G., et al., "Parametric Study of Electrostatic Fiber Formation," *The Fiber Society Spring Meeting*, May 23-25, 2001.

Ali, A., "Carbon Nanotube Reinforced Carbon Nano Composite Fibrils by Electro-Spinning," *Doctoral Thesis*, Drexel University, Oct. 2002.

Kwon, Y., et al., "Morphology and Stability of Growing Multiwall Carbon Nanotubes," *Physical Review Letters*, 79(11), 2065-2068, Sep. 1997.

Sinnott, S., et al., "Model of Carbon Nanotube Growth Through Chemical Vapor Deposition," *Chemical Physics Letters*, 315, 25-30, (1999).

Geohegan, D., et al., "Condensed Phase Growth of Single-Wall Carbon Nanotubes From Laser Annealed Nanoparticulates," *Applied Physics Letters*, 78(21), 3307-3309, May 21, 2001.

Setlur, A., et al., "A Promising Pathway to Make Multiwalled Carbon Nanotubes," *An Ab Initio Study, Physical Review Letters*, 76(21), 3008-3010, May 22, 2000.

Wang, Y., et al., "Carbon and Graphitic Nano-Fibers from Metallo-Organic Precursors," Retrieved from the Internet <URL: http://www.ee.upenn.edu/~santiago/research/nano.html> [retrieved on May 14, 2003].

Y. Lee, et al., "Catalytic Growth of Single-Wall Carbon Nanotubes: An Ab Initio Study," *Physical Review Letters*, 78(12), 2393-2396, Mar. 24, 1997.

Wang, Y. And Santiago-Aviles, J.J., "Low Temperature Electronic Properties of Electrospun PAN-Derived Carbon Nanofiber," *Nanotech 2003 Conference Technical Program Abstract*. Retrieved from the Internet <URL: http://www.nsti.org/2003showabstract.html?absno=485&title=Low%2-Temperature%20Electronic%20P...> [retrieved on May 14, 2003].

Maksimova, N., et al., "Catalytic Synthesis of Carbon Nanostructures From Polymer Precursors," *Journal of Molecular Catalysis A: Chemical*, 158(1), 301-307, Sep. 2000.

Diaz-de Leon, Manuel, "Electrospinning Nanofibers of Polyaniline and Polyaniline / (Polystyrene and Polyethylene Oxide) Blends," *Proceeding of The National Conference On Undergraduate Research*, University of Kentucky, Mar. 15-17, 2001.

Buer, A., et al., "Electrospinning and Properties of Some Nanofibers," *Textile Research Journal*, vol. 71(4), 2001, pp. 323-328.

Fang, X., et al., "DNA Fibers by Electrospinning," *J. Macromol. Sci. Phys*, B36(2), 1997, pp. 169-173.

Cloupeau, Michel, et al., "Electrohydrodynamic Spraying Functioning Modes: A Critical Review," J. Aerosol Sci., vol. 25(6), 1994, pp. 1021-1036.

Chun, Iksoo, et al., "Carbon Nanofibers from Polyacrylonitrile and Mesophase Pitch," *Journal of Advanced Materials*, vol. 31(1), Jan. 1999, pp. 36-41.

Fong, H., et al., "Beaded Nanofibers Formed During Electrospinning," *Polymer*, 40(1999), pp. 4585-4592.

Senador, Antonio, et al., Electrospinning of Polymeric Nanofibers: Analysis of Jet Formation, *MRS Fall Meeting*, 2000.

Reneker, D.H., et al., "Nanometre Diameter Fibres of Polymer, Produced by Electrospinning," Nanotechnology, vol. 7(1996) pp. 216-223.

Doshi, J., et al., "Electrospinning Process and Applications of Electrospun Fibers," *Journal of Electrostatics*, 35, 151-160 (1995).

\* cited by examiner

CARBON AND ELECTROSPUN NANOSTRUCTURES

RELATED APPLICATION

This application claims the benefit of U.S. Provisional Application No. 60/484,335, filed Jul. 2, 2003. The entire teachings of the above application are incorporated herein by reference.

GOVERNMENT SUPPORT

The invention was supported, in whole or in part, by grant MDA972-02-C-0029 from the Defense Advanced Research Projects Agency (DARPA). The Government has certain rights in the invention.

BACKGROUND OF THE INVENTION

Carbon nanostructures, for example, single wall carbon nanotubes ("SWNT") and multi-wall carbon nanotubes ("MWNT"), have attracted significant interest in recent years for their potentially unique electrical and mechanical properties. A major impediment to the development of materials based on carbon nanostructure technology, particularly SWNT and MWNT carbon nanotube technology, has been the relatively high cost and low production rates of carbon nanostructures such as SWNT and MWNT. Pure single wall carbon nanotubes are particularly expensive and typically have low production rates. Generally, the current synthesis methods for nanotubes utilize the self-assembly of gas phase carbon precursors onto a growing carbon nanotube. The production of carbon nanotubes, e.g., SWNT and MWNT, in such a manner appears to be limited by the availability of the carbon supply at the growing end of the carbon nanofiber and the population of the growing fibers within a reactor. The equipment costs associated with currently used methods for carbon nanotube synthesis, particularly SWNT and MWNT synthesis, indicate that true volume production is impractical.

SUMMARY OF THE INVENTION

The present invention is directed to the production of carbon and electrospun nanostructures, e.g., single wall carbon nanotubes ("SWNT") and/or multi-wall carbon nanotubes ("MWNT"), from mixtures containing a polymer, such as a thermoset (e.g. polyacrylonitrile or polyimide). In particular, the invention is directed to the production of nanostructures, for example, SWNT and/or MWNT, from mixtures, e.g., solutions, containing, for example, polyacrylonitrile, polyimide, polyaniline emeraldine base (PANi) or a salt thereof, an iron salt, e.g., iron chloride, and a solvent. In one embodiment, a mixture containing polyacrylonitrile, polyaniline emeraldine base or a salt thereof, an iron salt, e.g., iron chloride, and a solvent is formed and the mixture is electrospun to form nanofibers. In another embodiment, the electrospun nanofibers are then oxidized, e.g., heated in air, and subsequently pyrolyzed to form carbon nanostructures, e.g., SWNT and/or MWNT.

The present invention also includes a nanofiber produced by electrospinning a polymer solution. For example, the invention also includes a nanofiber comprising: (a) about 87 to about 99 weight percent of a thermoset polymer, such as a polyacrylonitrile or polyimide. The nanofiber can include greater than zero and less than about 7 weight percent polyaniline emeraldine base or a salt thereof; greater than zero and less than about 5 weight percent iron or a salt thereof. Also included in the invention is a uniform carbon nanostructure composition that can include, for example, single wall carbon nanotubes and/or a multi-wall carbon nanotubes, produced by a method comprising the steps: (a) forming a polymer solution including a polymer and a solvent; (b) electrospinning the polymer solution to form nanofibers; and (c) oxidizing, e.g., heating in air, and pyrolyzing the fibers to form carbon nanostructures.

DETAILED DESCRIPTION OF THE INVENTION

Figure 1:
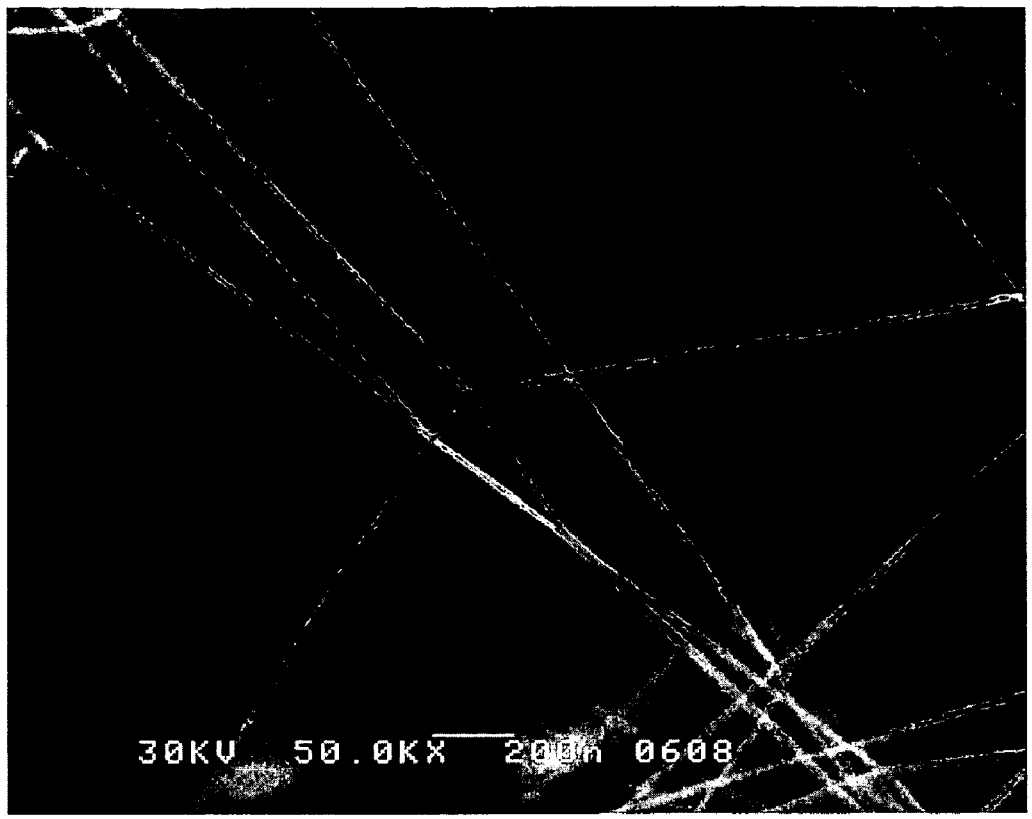
FIG. 1 is a Field Emission Scanning Electron Microscope (FESEM) image (50,000×) 15 nm polyacrylonitrile precursors to multi-wall nanotubes formed by the method of the invention.

The foregoing and other objects, features and advantages of the invention will be apparent from the following more particular description of embodiments of the invention. All percentages and parts are by weight unless otherwise indicated.

The present invention is directed to the production of nanostructures, e.g., single wall carbon nanotubes ("SWNT") and/or multi-wall carbon nanotubes ("MWNT"), from a polymer solution that includes, or example, a dissolved thermoset polymer, such as polyacrylonitrile or polyimide. In particular, the invention is directed to the production of nanostructures, for example, SWNT and/or MWNT, from mixtures, e.g., solutions, containing, for example, polyacrylonitrile, polyimide, polyaniline emeraldine base ("PANi") or a salt thereof, an iron salt, e.g., iron chloride, and a solvent.

In one embodiment, the mixture from which the nanofibers are electrospun comprises polyacrylonitrile and a solvent that dissolves polyacrylonitrile, for example, N,N-dimethylformamide ("DMF"). The mixture also contains polyaniline emeraldine base or a salt thereof and an iron salt. For example, the mixture contains about 1 to about 10, about 2 to about 5, about 3 to about 5, or about 4 weight percent polyacrylonitrile. The mixture also contains at least some but less than about 2 weight percent polyaniline emeraldine base or a salt thereof, e.g., more than zero but less than about 1, about 0.1 to about 0.5, or about 0.4 weight percent polyaniline emeraldine base or a salt thereof. The mixture also contains at least some but less than about 1 weight percent of an iron salt, e.g., greater than zero but less than about 0.9, about 0.1 to about 0.8, about 0.2 to about 0.7, or about 0.5 weight percent of an iron salt. After the components are combined, the mixture is preferably thoroughly mixed, for example, the mixture can be sonicated for a time sufficient to dissolve all of the components. In one embodiment, the mixture is ultrasonicated for about 8 hours.

In one embodiment, polymer nanofibers are produced by electrospinning a polymer solution that includes a polymer and a solvent for the polymer, such as an organic solvent. Examples of suitable polymers include polyacrylonitrile, polyimide, and polyaniline emeraldine base or a salt thereof. Examples of other components include a salt, such as a metal salt. Preferred salts include an iron salt, such as iron chloride. An example of a suitable organic solvent is N,N-dimethylformamide. Electrospinning uses an electrical potential, e.g., a kilovolt potential, to coerce the rapid ejection of nanofibers from a polymer solution in a nozzle. The methods of this invention form electrospun nanofibers by directing a polymer stream from a spinning source in an electric field created by source and counter electrodes, whereby the polymer is splayed to form electrospun nanofibers. The electrospun fibers are deposited onto a portion of a collecting surface between the source and counter electrodes.

Electrospinning in accordance with the present invention includes use of a spinning source in an electric field that is created by one or more source and counter electrodes. Fiber-forming polymeric material from a spinning source is directed into the electric field. The spinning process is driven by the electrical forces, generally in the form of free charges on the surface or inside the polymeric material. The spinning source has one or more orifices from which the polymeric material is ejected and can be oriented anywhere in space in or adjacent to the electric field. For example, the spinning source can be in the electric field, above the electric field, below the electric field, or horizontally adjacent to the electric field. The counter electrode(s) is a component or components toward which the stream or jet of polymeric fluid is directed due the presence of concentrations or areas of electric charge on the counter electrode(s). A collecting surface is interposed between said source and counter electrodes.

For example, in one embodiment, the polymer mixture is electrospun using a nozzle to substrate separation of about 3 to about 20 centimeters, a electrical potential of about 3 to about 40 kilovolts, direct current (DC), and a mixture flow rate of about 0.02 to about 2 milliliters/hour, to produce nanostructures, e.g., nanofibers.

Nanofibers produced from the above-identified polymer mixtures range in size from about 1 to about 100 nanometers in diameter. For example, nanofibers produced in accordance with the present invention can have diameters of about 1 to about 50, about 1 to about 25, about 1 to about 15, about 1 to about 10, or less than about 10 nanometers.

In one embodiment, the nanofibers are converted to single wall carbon nanotubes ("SWNT") and/or multi-wall carbon nanotubes ("MWNT"). The polymer chains of the nanofibers are oxidized to cyclize the polymer chains of the nanofiber. The cyclized polymer chains of the nanofiber are then graphitized to form SWNT and/or MWNT. The graphitization of the cyclized polymer chains of the nanofiber can be conducted in the presence of a catalyst, for example, iron or an iron containing compound or salt. For example, the present invention includes the conversion of the polymer nanofibers to SWNT and/or MWNT by heating the nanofibers in air and then pyrolyzing the nanofibers, for example, in an inert atmosphere, to produce the SWNT and/or MWNT carbon nanostructures. In one preferred embodiment, the electrospun nanofibers have diameters small enough so that formation of SWNT, versus MWNT, is preferred. Without wishing to be held to any particular theory, it is believed that nanofibers having relatively small diameters, for example, having a diameter less than about 10 nanometers, less than about 5 nanometers or about 2 nanometers, favor the formation of SWNT during graphitization of the nanofibers.

In one embodiment, the nanofibers are thermally oxidized by heating the nanofibers in air, for example, at a temperature of about 300° C. to about 350° C., e.g., about 310° C., for a time sufficient to cyclize the polymer chains of the nanofiber, e.g., about 5 to about 60 minutes, about 10 to about 40 minutes, about 15 to about 30 minutes, or about 20 minutes. In another embodiment, the oxidized, cyclized nanofibers are then placed in a furnace such as, for example, a tube furnace with a oxygen-free nitrogen purge. In one embodiment, the oxidized, cyclized nanofibers are heated to a temperature to effect pyrolyzation, for example, the oxidized, cyclized nanofibers are heated to about 900° C. to about 2,400° C., e.g., about 1,000° C. to about 2,000° C., about 1,100° C. to about 1,600° C., about 1,300° C. to about 1,500° C., or about 1,400° C. In one embodiment, the rate of heating is about 10° C./min. Preferably, the oxidized, cyclized nanofibers are heated to a sufficiently high temperature for a period of time sufficiently long to effect graphitization of the polymer chains of the nanofiber. For example, the oxidized, cyclized nanofibers are heated to a pyrolyzation temperature for about 1 minute to about 5 hours, about 1 minute to about 1 hour, about 1 minute to about 30 minutes, or about 5 minutes. In one embodiment, the nanofibers are heated in air at about 310° C. for about 20 minutes and then placed in a tube furnace with a oxygen-free nitrogen purge, heated to about 1,400° C. at about 10° C./min and pyrolized for about 5 minutes at about 1,400° C.

Pyrolyzation of the nanofibers causes formation of a uniform carbon nanostructure composition. In one embodiment, a majority of the carbon nanostructures have a diameter within a range of about 20 nm of each other. In a specific embodiment, at least about 50%, 60%, 70%, 80%, 90% or 95% of the carbon nanostructures of the composition having a diameter greater that 2 nanometers, have a diameter within about 20 nm of each other. In another specific embodiment, the diameter of any of the same percentages of carbon nanostructures of the composition are within about 10 nm of each other. In still another embodiment, at least about 50%, 60%, 70%, 80%, 90% or 95% of the carbon nanostructures will have a diameter in a range of between about 10 nm and about 20 nm.

Example

Figure 2:
FIG. 2 is a Transmission Electron Microscope (TEM) image (200,000×) of electrospun carbon fibers produced in accordance with the present invention. The marked tube in the image is about 15 nanometers in diameter.
Figure 3:
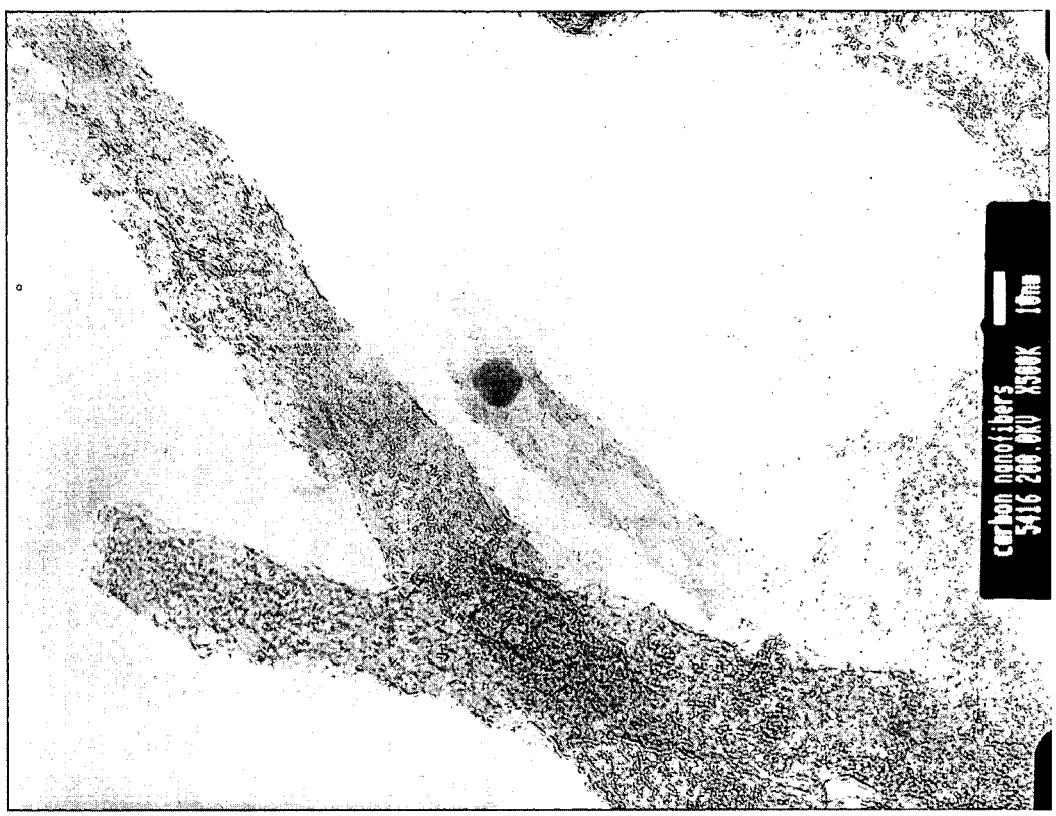
FIG. 3 is a TEM image (200,000×) of electrospun carbon fibers produced in accordance with the present invention. A dark catalyst particle is shown in the center of the image.
Figure 4:
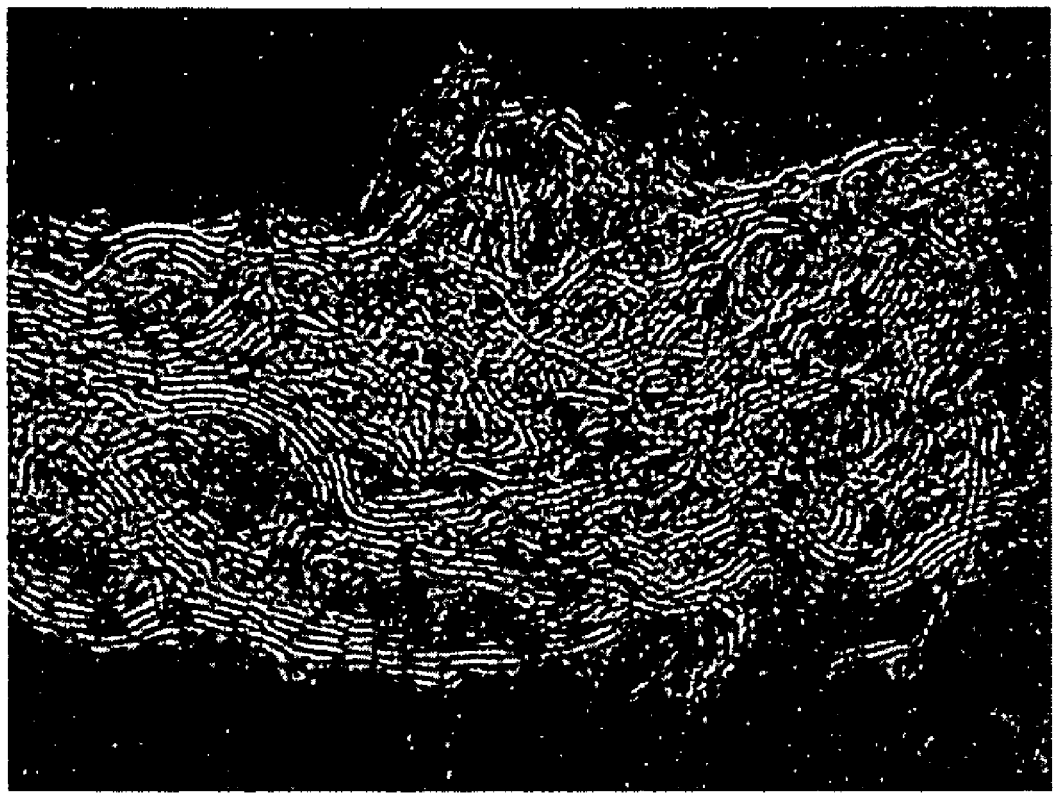
FIG. 4 is a TEM image (500,000×) of a single wall bundle made from an electrospun polyacrylonitrile by the method of the invention.

A solution was formed in N,N-dimethylformamide of 4% by weight low molecular weight polyacrylonitrile (PAN) (Sigma-Aldrich Co.; Molecular Weight: 86,200 daltons), 0.4% by weight polyaniline (PANi) emeraldine base (Organic Technologies, Lot# 17735NC), and 0.1% by weight iron chloride ($FeCl_2$). The solution was ultrasonicated until all of the polyacrylonitrile had dissolved, typically about 8 hours. The solution was electrospun to form nanofibers using parallel plate geometry with a 5 centimeter plate separation, a potential of 15 kilovolts (kV) DC, a solution flow rate of 0.25 milliliters/hour and a current of 160 nanoamperes (nA). FIG. 1 is an FESEM of a 15 nm polyarcrylonitrile precursor to a multi-wall nanotube formed by the method of the invention. The nanofibers were then heated in air at 310° C. for 20 minutes and then placed in a tube furnace with a oxygen-free nitrogen purge, heated to 1,400° C. at 10° C./min and pyrolized for 5 minutes at 1,400° C. The furnace was then cooled and the resulting carbon nanostructures were removed. Both the electrospun nanofibers and the carbon nanostructures had diameters of about 10 to about 12 nanometers when measured from electron micrographs. FIGS. 2, 3 and 4 show Transmission Electron Microscopy (TEM) images of electrospun carbon fibers produced in accordance with the present invention.

EQUIVALENTS

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for producing carbon nanotubes, comprising the steps of:
    (a) forming a polymer solution including an organic solvent and a polymer that includes at least one of polyacrylonitrile and polyimide;
    (b) electrospinning the polymer solution to form nanofibers having diameters in a range of between about 1 nanometer and about 10 nanometers; and
    (c) heating and pyrolyzing the fibers to form single-wall carbon nanotubes.

2. The method of claim 1 wherein the polymer solution includes between about 1 and about 10 weight percent polyacrylonitrile.

3. The method of claim 2 wherein the polymer solution includes between about 3 and about 5 weight percent polyacrylonitrile.

4. The method of claim 1, wherein the polymer solution further includes a salt.

5. The method of claim 4 wherein the salt is an iron salt.

6. The method of claim 5, wherein the iron salt includes iron chloride.

7. The method of claim 5 wherein the polymer solution includes greater than zero and up to about 0.5 weight percent iron salt.

8. The method of claim 7 wherein the polymer solution includes between about 0.05 and about 0.15 weight percent an iron salt.

9. The method of claim 1, wherein the polymer includes a conductive polymer.

10. The method of claim 9, wherein the conductive polymer includes at least one of polyaniline and polyethylene dioxythiophene.

11. The method of claim 10, wherein the polymer solution further includes a metal salt.

12. The method of claim 11, wherein the metal salt is iron chloride.

13. The method of claim 1 wherein the polymer solution includes greater than zero and up to about 1 weight percent polyaniline emeraldine base or a salt thereof.

14. The method of claim 13 wherein the polymer solution includes between about 0.3 and about 0.5 weight percent polyaniline emeraldine base or a salt thereof.

15. The method of claim 1, wherein pyrolization of the fibers causes formation of carbon nanostructures that include the single wall nanotubes, wherein at least about 50% of the carbon nanostructures have a diameter greater than 2 nanometers and have a diameter within 20 nanometers of each other.

16. The method of claim 15, wherein at least about 60% of the carbon nanostructures have a diameter greater than 2 nanometers and have a diameter within 20 nanometers of each other.

17. The method of claim 16, wherein at least about 70% of the carbon nanostructures have a diameter greater than 2 nanometers and have a diameter within 20 nanometers of each other.

18. The method of claim 17, wherein at least about 80% of the carbon nanostructures have a diameter greater than 2 nanometers and have a diameter within 20 nanometers of each other.

19. The method of claim 18, wherein at least about 90% of the carbon nanostructures have a diameter greater than 2 nanometers and have a diameter within 20 nanometers of each other.

20. The method of claim 19, wherein at least about 95% of the carbon nanostructures have a diameter greater than 2 nanometers and have a diameter within 20 nanometers of each other.

21. The method of claim 1, wherein at least about 50% of the carbon nanostructures have a diameter within about 10 nanometers of each other.

22. The method of claim 21, wherein at least about 60% of the carbon nanostructures have a diameter within about 10 nanometers of each other.

23. The method of claim 22, wherein at least about 70% of the carbon nanostructures have a diameter within about 10 nanometers of each other.

24. The method of claim 23, wherein at least about 80% of the carbon nanostructures have a diameter within about 10 nanometers of each other.

25. The method of claim 24, wherein at least about 90% of the carbon nanostructures have a diameter within about 10 nanometers of each other.

26. The method of claim 25, wherein at least about 95% of the carbon nanostructures have a diameter within about 10 nanometers of each other.

27. The method of claim 1, wherein the fibers are pyrolyzed at a temperature in the range of between about 900° C. to about 2,400° C.

28. The method of claim 27, wherein the fibers are pyrolyzed at a temperature in the range of between about 1,000° C. to about 2,000° C.

29. The method of claim 28, wherein the fibers are pyrolyzed at a temperature in the range of between about 1,100° C. to about 1,600° C.

30. The method of claim 29, wherein the fibers are pyrolyzed at a temperature in the range of between about 1,300° C. to about 1,500° C.

31. The method of claim 30, wherein the fibers are pyrolyzed at a temperature in the range of between about 1,300° C. to about 1,400° C.

32. The method of claim 1, wherein the nanotubes are heated in air at a temperature in a range of between about 300° C. to about 350° C., for a period of time in a range of between about 5 minutes and about 60 minutes, and then placed in a tube furnace with an oxygen-free nitrogen purge, heated to a temperature of about 2,400° C. and then pyrolyzed for a period of time in a range of between about one minute and about five hours.

* * * * *